US008272160B1

(12) United States Patent
Hamann

(10) Patent No.: US 8,272,160 B1
(45) Date of Patent: Sep. 25, 2012

(54) VINE STAND

(76) Inventor: Robert Hamann, Lake Hapatcong, NJ (US)

(*) Notice: Subject to any disclaimer, the term of this patent is extended or adjusted under 35 U.S.C. 154(b) by 0 days.

(21) Appl. No.: 12/932,400

(22) Filed: Feb. 24, 2011

Related U.S. Application Data

(60) Provisional application No. 61/341,441, filed on Mar. 31, 2010.

(51) Int. Cl.
*A01G 17/06* (2006.01)
(52) U.S. Cl. .......................................................... 47/45
(58) Field of Classification Search ............... 47/1.01 S, 47/39, 41.13–41.15, 44, 45, 47, 67, 70, 78
See application file for complete search history.

(56) References Cited

U.S. PATENT DOCUMENTS

| | | | |
|---|---|---|---|
| 425,745 A | 4/1890 | Brown et al. | |
| 3,165,863 A | 1/1965 | Duran et al. | |
| 4,096,662 A * | 6/1978 | Anderson | 47/70 |
| 4,584,792 A * | 4/1986 | Etzel | 47/70 |
| 4,610,106 A * | 9/1986 | Robinson | 47/45 |
| 5,450,691 A | 9/1995 | Christie et al. | |
| 5,752,341 A * | 5/1998 | Goldfarb | 47/78 |
| 5,862,625 A | 1/1999 | Parker | |
| 6,370,820 B1 * | 4/2002 | Moss | 47/81 |

\* cited by examiner

*Primary Examiner* — Rob Swiatek
*Assistant Examiner* — Ebony Evans
(74) *Attorney, Agent, or Firm* — Emery L. Tracy

(57) ABSTRACT

A vine supporting device for manipulating the growth, direction, and distribution of vines and other creeping plants is provided. The vine supporting device comprises a base having a top and a bottom. A support pole is mounted in a substantially vertical direction to the top of the base. A plurality of wire mount slots is formed in the top of the base and around a perimeter of the base. A plurality of wire frames are provided with each wire frame having a first end and a second end and the first end releasably securable in one of the wire mount slots. A top cap is positionable on top of the support poles with the second ends of the wire mounts positionable and releasably secured under the top cap. Upon positioning the vine upon the top of the base, the support pole and wire frames control and direct growth of the vine.

18 Claims, 1 Drawing Sheet

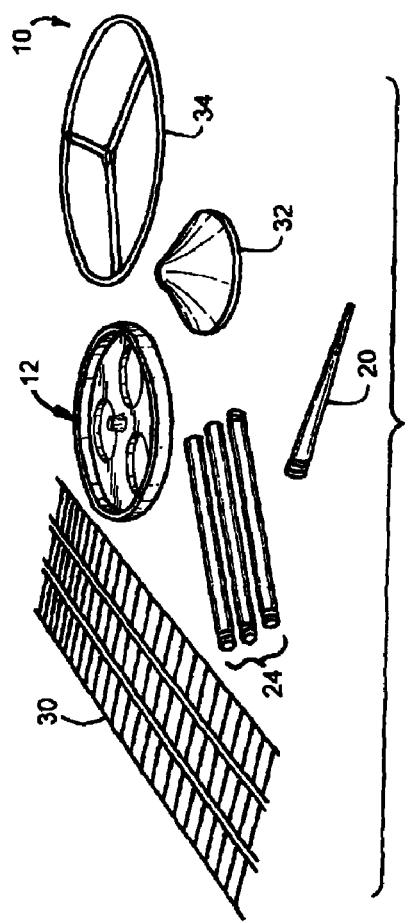
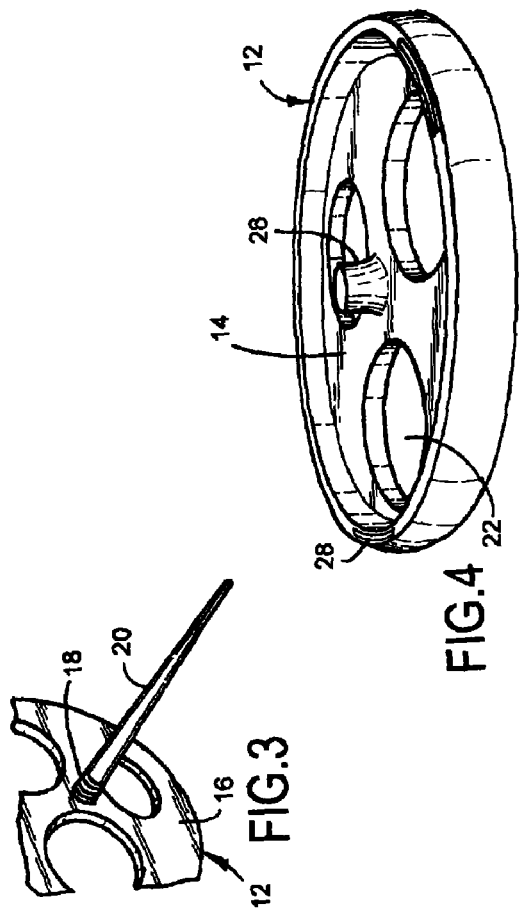
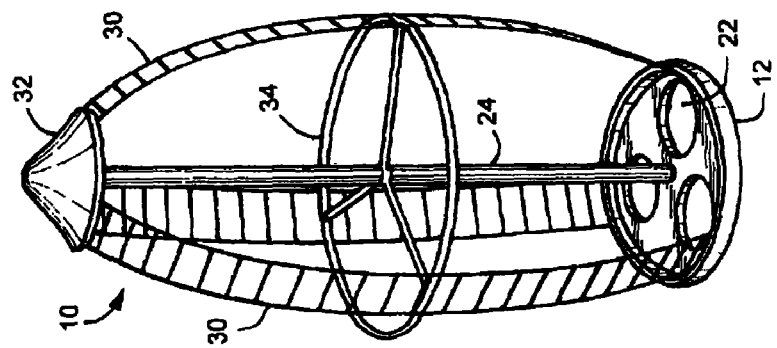

VINE STAND

The present application claims the benefit of priority of pending provisional patent application Ser. No. 61/341,441, filed on Mar. 31, 2010, entitled "Vine Stand".

BACKGROUND OF THE INVENTION

1. Field of the Invention

This invention relates generally to a vine stand and, more particularly, the invention relates to a vine stand enabling users to manipulate the growth, direction, and distribution of vines and other creeping plants.

2. Description of the Prior Art

A delightful addition to any home decor is potted plants and flowers. Carefully placed plants and fresh flowers can set the tone for a room, creating a mood through lush greenery, aromatic scents and a simple reminder of the outdoors. Outdoors, plants provide a simple means of enhancing the appearance of a home, garden or yard, creating a pleasing and welcoming environment. Providing a sense of balance and a pleasant atmosphere, plants are a decorative element that truly serves a functional purpose. In fact, many people fail to appreciate that 100% of the oxygen we breathe is a direct product of photosynthetic plants. For many people, a favorite type of plants is vines. Vines have both aesthetic and functional purposes and are more versatile than most plants, as they can grow horizontally as ground covers or climb upwards on arbors, beams and other supports creating a dramatic effect.

SUMMARY

The present invention is a vine supporting device for manipulating the growth, direction, and distribution of vines and other creeping plants. The vine supporting device comprises a base having a top and a bottom. A support pole is mounted in a substantially vertical direction to the top of the base. A plurality of wire mount slots is formed in the top of the base and around a perimeter of the base. A plurality of wire frames are provided with each wire frame having a first end and a second end and the first end releasably securable in one of the wire mount slots. A top cap is positionable on top of the support poles with the second ends of the wire mounts positionable and releasably secured under the top cap. Upon positioning the vine upon the top of the base, the support pole and wire frames control and direct growth of the vine.

In addition, the present invention includes a method for manipulating the growth, direction, and distribution of vines and other creeping plants. The method vine comprises providing a base having a top and a bottom, vertically mounting a support pole to the top of the base, forming a plurality of wire mount slots in the top of the base and around a perimeter of the base, providing a plurality of wire frames, each wire frame having a first end and a second end, releasably securing the first end of each wire frame in one of the wire mount slots, positioning a top cap on top of the support poles, positioning and releasably securing the second ends of the wire mounts under the top cap, positioning the vine upon the top of the base, and controlling and directing the growth of the vine.

The present invention further includes a vine supporting device for manipulating the growth, direction, and distribution of vines and other creeping plants. The vine supporting device comprises a base having a top and a bottom. At least one opening is formed through the base for receiving a plant pot. A support pole is mounted in a substantially vertical direction to the top of the base. A plurality of wire mount slots is formed in the top of the base and around a perimeter of the base. A plurality of wire frames is provided with each wire frame having a first end and a second end and the first end releasably securable in one of the wire mount slots. A top cap is positionable on top of the support poles with the second ends of the wire mounts positionable and releasably secured under the top cap. A support is positionable approximately half way between the base and the top cap with the support urging the wire mounts in a general outward direction. Upon positioning the vine upon the top of the base, the support pole and wire frames control and direct growth of the vine.

BRIEF DESCRIPTION OF THE DRAWINGS

FIG. 1 is a perspective view illustrating the various components of a vine stand, in accordance with the present invention, namely a base, a plurality of poles, a spike, a plurality of wire frames, a top cap, and an optional support;

FIG. 2 is a perspective view illustrating the vine stand of FIG. 1, constructed in accordance with the present invention;

FIG. 3 is a perspective view of the base of the vine stand of FIG. 1, constructed in accordance with the present invention, with the spike mounted to the base; and FIG. 4 is a perspective view illustrating the base of the vine stand of FIG. 1, constructed in accordance with the present invention, with spaced wire mount slots formed around a perimeter of the base and a pole screw mount formed in the center of the base.

DETAILED DESCRIPTION OF THE PREFERRED EMBODIMENTS

As illustrated in FIGS. 1-4, the present invention is a vine stand, indicated generally at 10, for enabling users to manipulate the growth, direction, and distribution of vines and other creeping plants. The vine stand 10 of the present invention is a specially designed vertical support on which any variety of vines can grow and flourish, with the vine stand 10 discreetly hidden beneath the abundant greenery.

The vine stand 10 of the present invention includes an open, substantially circular-shaped base 12 having a top 14 and a bottom 16. The bottom 16 of the base 12 has a threaded protrusion 18 for threadably receiving a heavy-duty lawn spike 20 for use in securing the vine stand 10 in the ground when the vine stand 10 is being used outdoors. It should be noted that in an alternative embodiment, the lawn spike 20 can be integrally formed on the bottom 16 of the base 12. The base 12 further includes at least one opening 22 for receiving a plant pot. An open, wheel-like framework, the base 12 preferably measures approximately eighteen (18") inches in diameter and provides structural support to the vine stand 10 and attached vine, but is easily covered by grass, mulch or flowers, thus effectively hiding the base 12 from view.

In addition, the vine stand 10 of the present invention includes a support pole 24 threadably mounted in a substantially vertical direction from a pole screw mount 26 formed in the approximate center of the top 14 of the base 12. The support pole 24 can be constructed as fully adjustable, constructed of telescoping components, with each two (2') feet section of the support pole 24 being slightly smaller in diameter than the lower, adjacent section in which it is inserted. The support pole 24 measures approximately two (2') feet in height when compacted, expanding up to eight (8') feet to ten (10') when fully extended. In another embodiment, the support pole 24 can be constructed in a plurality sections threadably attached to each other and extending vertically upward from the base 12. The support pole 24 provides a vertical extension on which vines can be started and allowed to flourish.

Formed around a perimeter of the top 14 of the base 12 of the vine stand 10 of the present invention is a plurality of wire mount slots 28 for releasably receiving wire frames 30. In a preferred embodiment, the base 12 includes three wire mount slots 28 evenly spaced about the perimeter with a first end of a single wire frame 30 releasably secured within each wire mount slot 28. The wire frame 30 can be provided in a retractable spool on which a roll of high gauge plant wire is secured and easily accessed for use in securing the growing vine to the vine stand 10 or directing the growth onto other greenery or structures.

The vine stand 10 of the present invention further includes a top cap 32 positionable on top of the support pole 24. The second ends of the wire frames 30 are positioned under the top cap 32 and held therein by friction or the like. Preferably, the diameter of the top cap 32 is less than the diameter of the base 12 allowing the second ends of the resilient wire frames 30 to be held under the top cap 32.

In an embodiment of the vine stand 10 of the present invention, the vine stand 10 includes a support 34 positionable approximately halfway between the base 12 and the top cap 32. The support 34 urges the wire frames 30 in a general outward direction and further assists in causing the second ends of the wire frames 30 to be held under the top cap 32.

Preferably, the vine stand 10 of the present invention is dark green in color, thus can be discreetly camouflaged amongst other outdoor greenery. The vine stand 10 can be utilized anywhere on a lawn to provide structural support for vines such as Virginia creeper, ivy, and wisteria, to name a few options. Further, the vine stand 10 can be utilized indoors and installed within a large planter for use in growing vines within the home. The vine stand 10 is preferably constructed primarily of heavy duty plastic material and featuring wire and metal components.

The vine stand 10 of the present invention offers users a number of significant benefits and advantages. Foremost, the vine stand 10 provides users a unique and exciting way in which to grow lush and bountiful vines. An easily installed and fully adjustable support on which vines readily grow and flourish, the vine stand 10 enables users to grow a wide variety of vines, from ivy and clematis to Virginia Creeper and wisteria, to name a few options, in a simple and expeditious manner. With vines "trained" to grow up the vine stand 10 via the telescoping support pole(s) and application of support wire frames 30, use of the vine stand 10 enables users to create any number of exciting landscape designs, with one, simple to use product. Sparing the homeowner the expense of purchasing costly arbors or columns simply in order to grow vines, the vine stand 10 enables users to grow vines without spending a fortune in the process. A creative tool, the vine stand 10 enables users to create a variety of dramatic looks, which enhance their landscape, while the vine stand 10 is completely camouflaged from view. Lightweight and portable, the vine stand 10 can be easily moved about a lawn or garden, enabling the user to position the vine stand 10 in accordance to changes in sunlight and season. Well-suited for outdoor use, the vine stand 10 can also be utilized indoors as a means of growing vines in household planters. Although the vine stand 10 is geared toward the general household user, landscape designers and lawn care specialists will also appreciate the versatility that the vine stand 10 affords, providing them and their clients with a stylish and affordable gardening tool.

The vine stand 10 of the present invention provides users an effective means of dramatically enhancing the appearance of vines. Providing a durable, cleverly designed support on which a variety of vines can grow and flourish, the vine stand 10 proves a favorite commodity in any household, transforming an ordinary landscape into an extraordinary showpiece.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A vine supporting device for manipulating the growth, direction, and distribution of vines and other creeping plants, the vine supporting device comprising:
    a base having a top and a bottom;
    a support pole mounted in a substantially vertical direction to the top of the base;
    a plurality of wire mount slots formed in the top of the base and around a perimeter of the base;
    a plurality of wire frames, each wire frame having a first end and a second end, the first end releasably securable in one of the wire mount slots;
    a top cap positionable on top of the support pole, the second end of each of the wire frames positionable and releasably secured under the top cap; and
    a support positionable approximately half way between the base and the top cap, the support urging the wire frames in a general outward direction;
    wherein upon positioning a vine upon the top of the base, the support pole and wire frames control and direct growth of the vine.

2. The vine supporting device of claim 1 wherein the bottom of the base has a threaded protrusion, and further comprising:
    a spike threadably securable to the threaded protrusion.

3. The vine supporting device of claim 1 and further comprising:
    at least one opening formed through the base for receiving a plant pot.

4. The vine supporting device of claim 1 and further comprising:
    a pole screw mount formed in the center of the top of the base, the support pole mountable to the pole screw mount.

5. The vine supporting device of claim 1 wherein the support pole comprises a plurality of telescoping components, with each component of the support pole being slightly smaller in diameter than the lower, adjacent component in which it is inserted.

6. The vine supporting device of claim 1 wherein the support pole comprises a plurality sections threadably attached to each other and extending vertically upward from the base.

7. The vine supporting device of claim 1 wherein the plurality of wire mount slots comprises three wire mount slots evenly spaced about the perimeter of the base.

8. The vine supporting device of claim 1 wherein the top cap has a diameter less than a diameter of the base.

9. A method for manipulating the growth, direction, and distribution of vines and other creeping plants, the method comprising:
- providing a base having a top and a bottom;
- vertically mounting a support pole to the top of the base;
- forming a plurality of wire mount slots in the top of the base and around a perimeter of the base;
- providing a plurality of wire frames, each wire frame having a first end and a second end;
- releasably securing the first end of each wire frame in one of the wire mount slots;
- positioning a top cap on top of the support pole;
- positioning and releasably securing the second end of each of the wire frames under the top cap;
- positioning a vine upon the top of the base;
- controlling and directing the growth of the vine;
- forming at least one opening through the base; and
- inserting a plant pot in the opening.

10. The method of claim 9 and further comprising:
- forming a threaded protrusion on the bottom of the base; and
- threadably securing a spike to the threaded protrusion.

11. The method of claim 9 and further comprising:
- forming a pole screw mount in the center of the top of the base; and
- mounting the support pole to the pole screw mount.

12. The method of claim 9 wherein the support pole comprises a plurality of telescoping components, with each component of the support pole being slightly smaller in diameter than the lower, adjacent component in which it is inserted.

13. The method of claim 9 wherein the support pole comprises a plurality sections threadably attached to each other and extending vertically upward from the base.

14. The method of claim 9 wherein the top cap has a diameter less than a diameter of the base.

15. The method of claim 9 and further comprising:
- positioning a support positionable approximately half way between the base and the top cap; and
- urging the wire frames in a general outward direction.

16. A vine supporting device for manipulating the growth, direction, and distribution of vines and other creeping plants, the vine supporting device comprising:
- a base having a top and a bottom;
- at least one opening formed through the base for receiving a plant pot;
- a support pole mounted in a substantially vertical direction to the top of the base;
- a plurality of wire mount slots formed in the top of the base and around a perimeter of the base;
- a plurality of wire frames, each wire frame having a first end and a second end, the first end releasably securable in one of the wire mount slots;
- a top cap positionable on top of the support pole, the second end ends of each of the wire frames positionable and releasably secured under the top cap; and
- a support positionable approximately half way between the base and the top cap, the support urging the wire frames in a general outward direction;
- wherein upon positioning a vine upon the top of the base, the support pole and wire frames control and direct growth of the vine.

17. The vine supporting device of claim 16 wherein the bottom of the base has a threaded protrusion, and further comprising:
- a spike threadably securable to the threaded protrusion.

18. The vine supporting device of claim 16 and further comprising:
- a pole screw mount formed in the center of the top of the base, the support pole mountable to the pole screw mount.

* * * * *